(12) United States Patent
McComas et al.

(10) Patent No.: US 8,894,007 B2
(45) Date of Patent: Nov. 25, 2014

(54) SYSTEMS AND METHODS FOR LAUNCHING A FOLDING AIRCRAFT

(75) Inventors: Andrew McComas, Boundridge Island, WA (US); Jon Clark, Kirkland, WA (US)

(73) Assignee: Stark Aerospace, Inc., Redmond, WA (US)

( * ) Notice: Subject to any disclaimer, the term of this patent is extended or adjusted under 35 U.S.C. 154(b) by 211 days.

(21) Appl. No.: 13/558,728

(22) Filed: Jul. 26, 2012

(65) Prior Publication Data

US 2013/0026286 A1 Jan. 31, 2013

Related U.S. Application Data

(60) Provisional application No. 61/511,719, filed on Jul. 26, 2011.

(51) Int. Cl.
*B64F 1/04* (2006.01)
*B64F 1/06* (2006.01)

(52) U.S. Cl.
CPC ............. *B64F 1/06* (2013.01); *B64C 2201/102* (2013.01); *B64C 2201/084* (2013.01)
USPC .................. 244/63; 446/64; 446/65; 446/430

(58) Field of Classification Search
USPC .................. 124/26, 37; 446/64, 65, 429, 430; 89/1.8, 1.816; 102/342, 351, 357
See application file for complete search history.

(56) References Cited

U.S. PATENT DOCUMENTS

| 3,968,947 A * | 7/1976 | Schlegel et al. ................. 244/63 |
| 4,165,729 A * | 8/1979 | Niemirow ........................ 124/17 |
| 2012/0115391 A1 * | 5/2012 | Grisolia et al. ................. 446/64 |

OTHER PUBLICATIONS

Switchblade™ LMAMS product description 2011—(5 pages).
Maveric™ Product Description 2011—(21 pages).

* cited by examiner

*Primary Examiner* — Tien Dinh
*Assistant Examiner* — Nicholas McFall
(74) *Attorney, Agent, or Firm* — Finnegan Henderson Farabow Garrett & Dunner, L.L.P.

(57) ABSTRACT

A canister system for a folding aircraft may include a canister housing and a launch mechanism powered by one or more compression springs. A hand-operated drive mechanism may rotate a plurality of threaded rods to drive the launch mechanism from a released position to a cocked position, in which mechanical energy is stored in the springs. A latch mechanism may capture the launch mechanism in the cocked position. The canister may include a housing for receiving and storing the aircraft when the launch mechanism is in the cocked position. A trigger mechanism may release the latch mechanism, permitting the energy stored in the compressed springs to drive the launch mechanism toward the released position and propel the aircraft from the housing at launch velocity.

23 Claims, 11 Drawing Sheets

SYSTEMS AND METHODS FOR LAUNCHING A FOLDING AIRCRAFT

CROSS-REFERENCE TO RELATED APPLICATIONS

This application claims benefit of priority to U.S. Provisional Application No. 61/511,719, filed Jul. 26, 2011, which is expressly incorporated herein by reference in its entirety.

TECHNICAL FIELD

The invention relates to aeronautics and, more particularly, to systems and methods for storing and launching a folding aircraft.

BACKGROUND

While the vast majority of aircraft have rigid wings, a few have flexible or folding wings which allow for compact storage, portability, and the potential to be launched out of a tube or canister. Presently available launch canisters typically use compressed gas or explosive charges to propel the aircraft (typically an Unmanned Aerial System, "UAS") out of the tube. This precludes reuse of the launching canister without replacing or refilling the propellant, which may be difficult, costly or impossible in certain field operations. It is therefore desirable to provide systems and methods for storing and launching a folding aircraft which addresses these issues.

SUMMARY

Accordingly, there is provided a system for launching an aircraft, comprising a housing, a plurality of guide members mounted within the housing and comprising first engagement members, and one or more springs. The system may further include a launch member slidably movable along the guide members between cocked and released positions, the launch member comprising at least one thrust member adapted to engage the aircraft; a cocking mechanism slidably moveable along the guide members; and a second engagement member attached to the cocking mechanism and engaging the first engagement member. The system may further include a drive mechanism mounted on the housing and operable when driven to operate the first and second engagement members so as to draw the cocking mechanism against the launch member, drive the launch member along the guide members from the released to the cocked position, and energize the springs. The system may further include a latch mechanism operable to latch the launch member in the cocked position and a trigger mechanism operable when activated to release the latch mechanism so as to permit the springs to drive the launch member from the cocked to the released position.

Also provided is a system for launching an aircraft, comprising a tubular housing, a plurality of threaded guide members mounted within the housing, one or more springs positioned around the guide members, and a launch member slidably movable along the guide members between cocked and released positions, the launch member comprising at least one thrust member adapted to engage the aircraft. The system may also include a cocking mechanism slidably moveable along the guide members, and a threaded engagement member attached to the cocking mechanism and engaging threads of the threaded rods. The system may further include a drive mechanism mounted on the housing and operable when driven to rotate the threaded rods within the engagement member so as to draw the cocking mechanism against the launch member, drive the launch member along the guide members from the released to the cocked position, and compress the springs. The system may further include a latch mechanism operable to latch the launch member in the cocked position and a trigger mechanism operable when activated to release the latch mechanism so as to permit the springs to drive the launch member from the cocked to the released position.

Also provided is a method for launching a folding aircraft. The method may include placing the aircraft in a housing; and rotating a drive mechanism attached to the housing to drive a cocking mechanism against a launch member, move the launch member from a released position to a cocked position, and store mechanical energy in one or more springs. The method may also include latching the launch member in the cocked position and rotating the drive mechanism to drive the cocking mechanism to a launch position away from the released position. The method may further operating a trigger mechanism to release the launch member from the cocked position, apply the stored mechanical energy to the launch member, and propel the aircraft from the housing.

DETAILED DESCRIPTION

Figure 1:
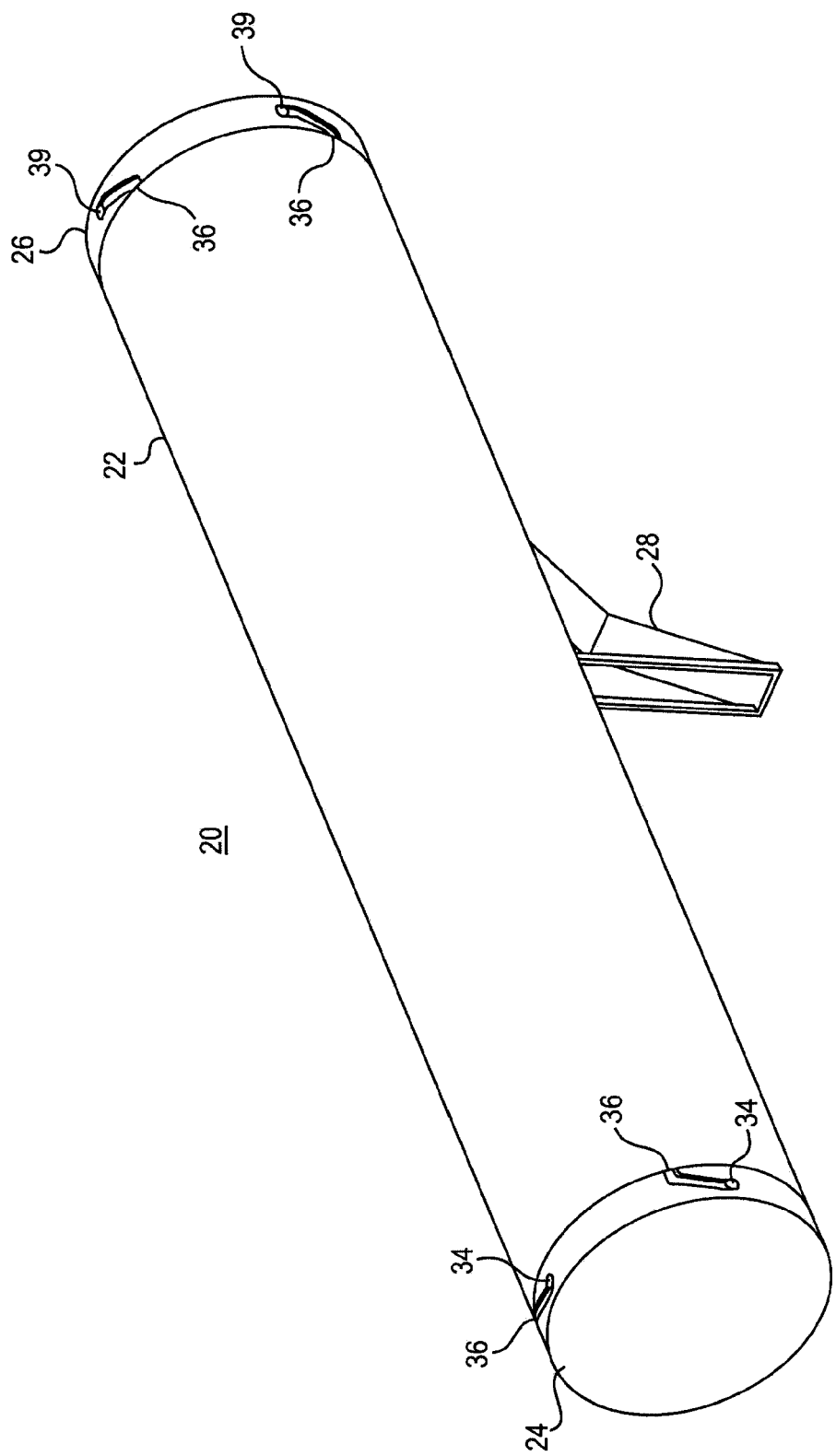
FIG. 1 is a perspective view of an exemplary canister system, consistent with the disclosed embodiments.

Reference will now be made in detail to the present embodiments of the disclosure, certain examples of which are illustrated in the accompanying drawings. Wherever possible, like reference characters refer to like components.

A container, or canister, system has been designed which may be used for storing, transporting and launching a small, folding aircraft. The system may use a minimum of parts for reliability and maintenance, and may be immediately reused without replacing or refilling any parts or propellants. Energy may be stored by stretching or compressing one or more springs and may then be released by triggering of a latch mechanism. Triggering of the latch mechanism may release a launch member that propels the aircraft to launch speed. A hand crank may be used to cock the system, thus allowing repeated launches with little time between cycles.

Referring now to FIG. 1, an exemplary canister system 20 may include a tubular housing 22. A pair of end caps 24, 26 may be removably attached to housing 22 for protection of an aircraft stored in housing 22. A shoulder support 28 may be attached to housing 22 to facilitate launch of the aircraft while a user is standing. Shoulder support 29 may fold down against housing 22 for ease of transport.

Figure 2:
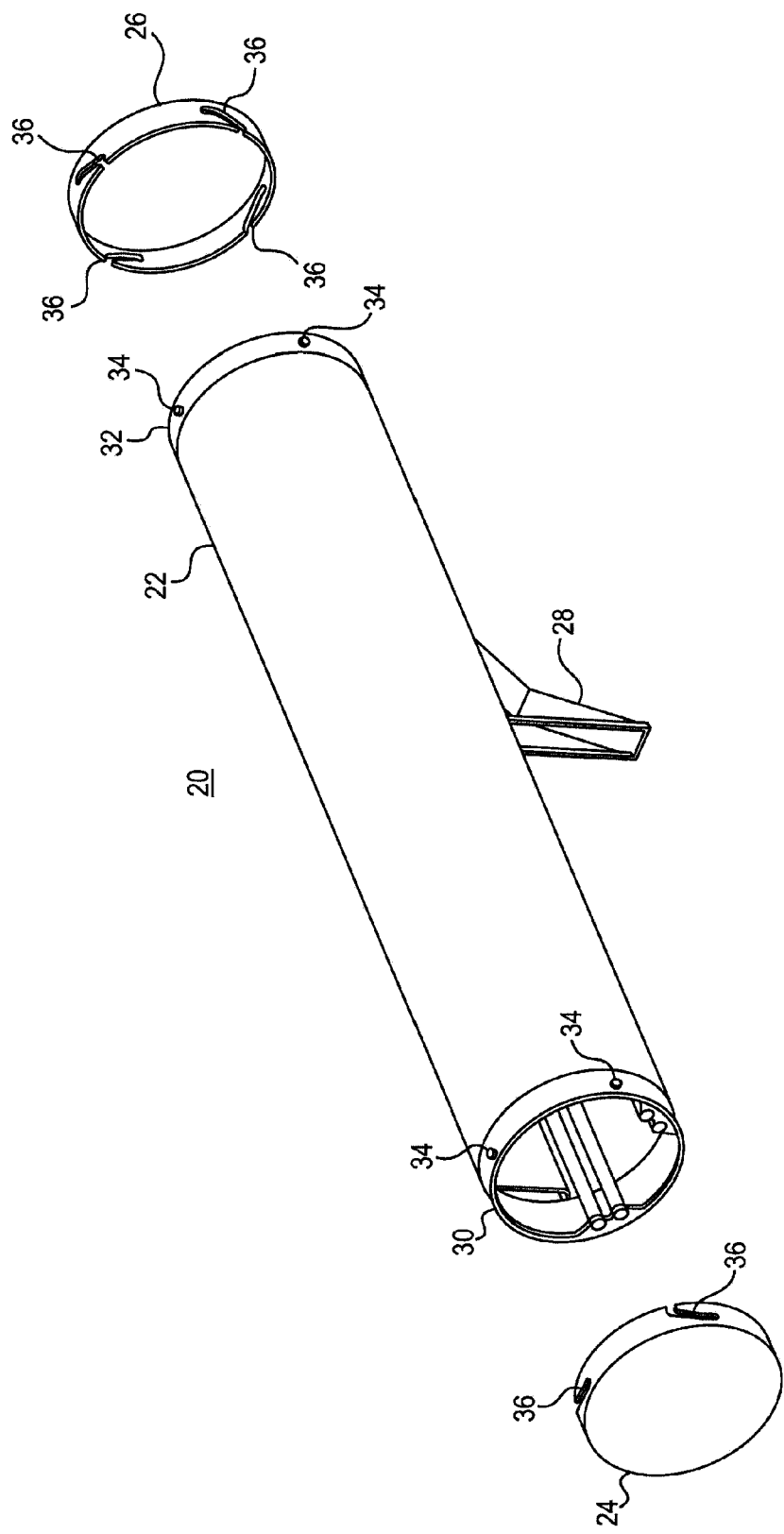
FIG. 2 is a perspective view of the system of FIG. 1, with end caps removed.

Referring now to FIG. 2, housing 22 may include front and rear tube rings 30, 32, which have cap pins 34 formed therein. Pins 34 may cooperate with slots 36 in end caps 24, 26 to provide protection for the aircraft during transport of system 20. Tube rings 30, 32 may include rubber O-rings or other sealing devices, not shown, to cooperate with end caps 24, 26 to provide even greater protection of the aircraft during transport.

Figure 3:
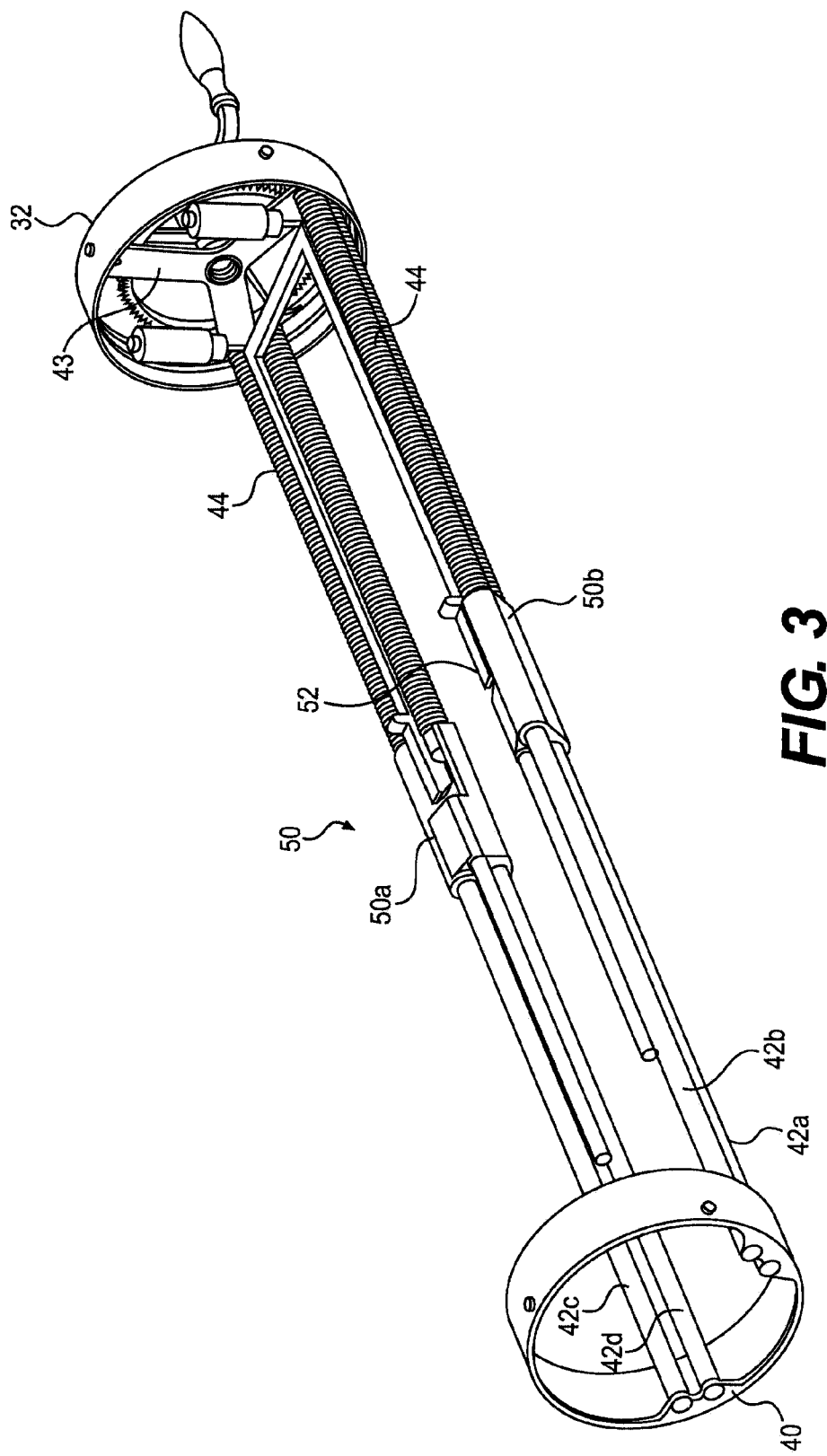
FIG. 3 is a perspective view of the system of FIGS. 1 and 2 with a launch mechanism exposed.

Referring now to FIG. 3, front tube ring 30 may include a flange 40 perpendicular to the axis of housing 22. Flange 40 may provide support for front ends of a plurality of guide rods 42, such as guide rods 42a-42d. The rear ends of guide rods 42a-42d may be supported by a spider member 43 positioned at the rear of housing 22, such as by attachment to rear tube ring 32. One or more springs 44 may be positioned coaxially around and supported by some or all of guide rods 42a-42d. The number of guide rods 42 and springs 44 may vary, depending upon the amount of stored mechanical energy required to launch an aircraft. Some or all of guide rods 42 may have engagement members, such as threads formed therein. For example, in the embodiment of FIGS. 1-6, two guide rods 42b and 42c may have threads 45 (FIG. 5), formed therein.

A launch mechanism 50 may have launch members 50a, 50b slidably positioned upon guide rods 42a-42d. Launch member may be movable along guide rods 42a-42d between a cocked position toward the rear of housing 22 (to the right in FIGS. 1-3) in which springs 44 are in a compressed condition, and a released position toward the front of housing 22. Launch members 50a, 50b may be joined by a connecting member (not shown) to form a single-piece launch mechanism. A latch mechanism 52 may be provided to secure launch mechanism 50 in the cocked position, against the force of compressed springs 44.

Figure 4:
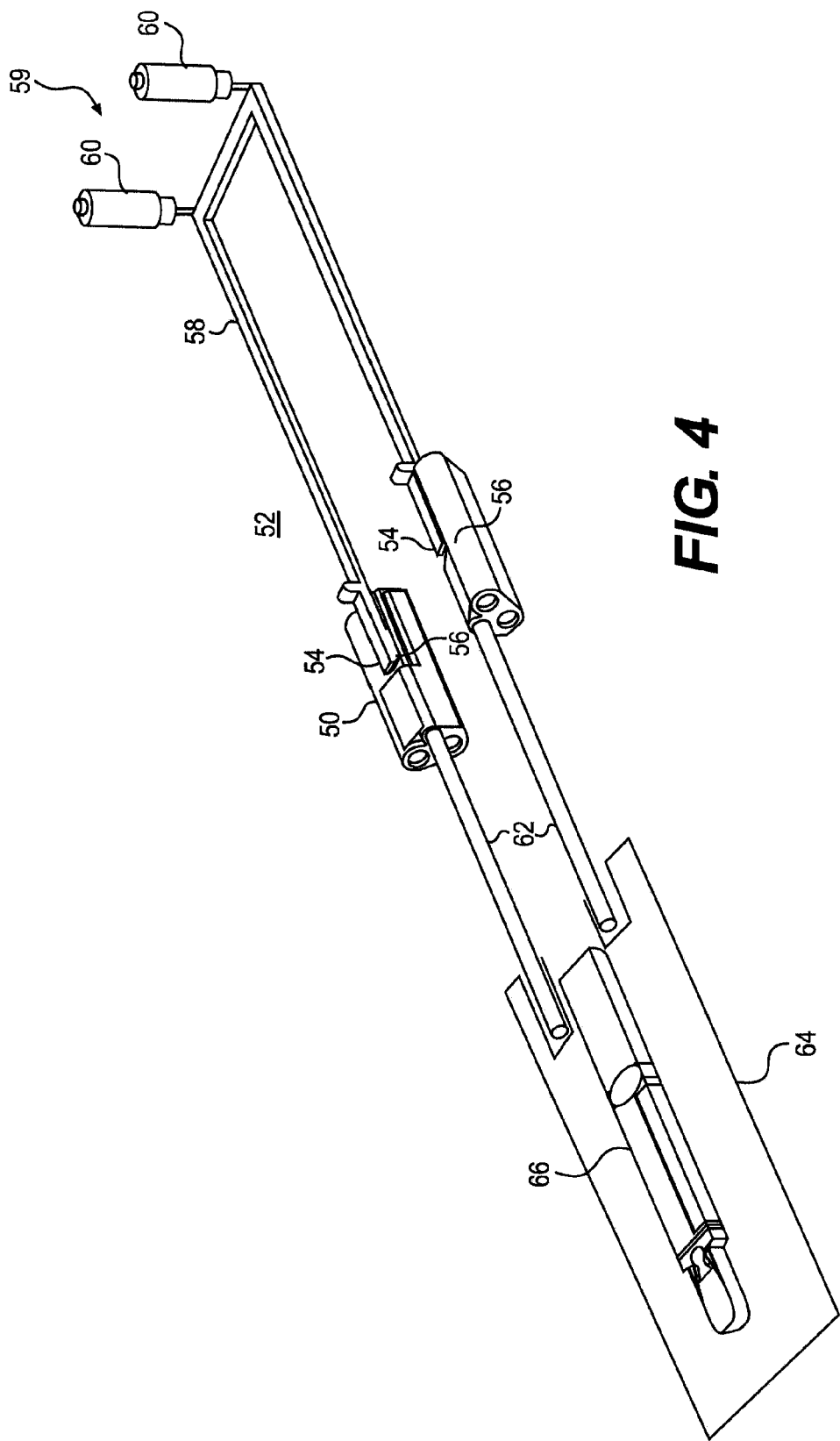
FIG. 4 is a detailed perspective view of launch and latch mechanisms shown in FIG. 3.

As seen in FIG. 4, latch mechanism 52 may, for example, include ears 54 which may engage corresponding notches 56 on launch member 50, to secure launch member 50 in the cocked position. Latch mechanism 52 may include a frame 58 which may be engaged by a trigger mechanism 59, for example, using solenoids 60, to move ears 54 out of engagement with notches 56 and allow mechanical energy stored in springs 44 to propel launch member 50 from the cocked position to the released position. Solenoids 60 may be energized by a pushbutton switch and battery, not shown. Alternatively, a mechanical trigger mechanism with a mechanical linkage may be employed, operated by a mechanical trigger, not shown.

Launch mechanism 50 may include one or more thrust members 62 to engage an associated aircraft 64. When launch mechanism 50 is released, thrust members 62 may guide and propel aircraft 64 out of housing 22, permitting folded wings 66 of aircraft 64 to extend, thereby launching aircraft 64.

Figure 5:
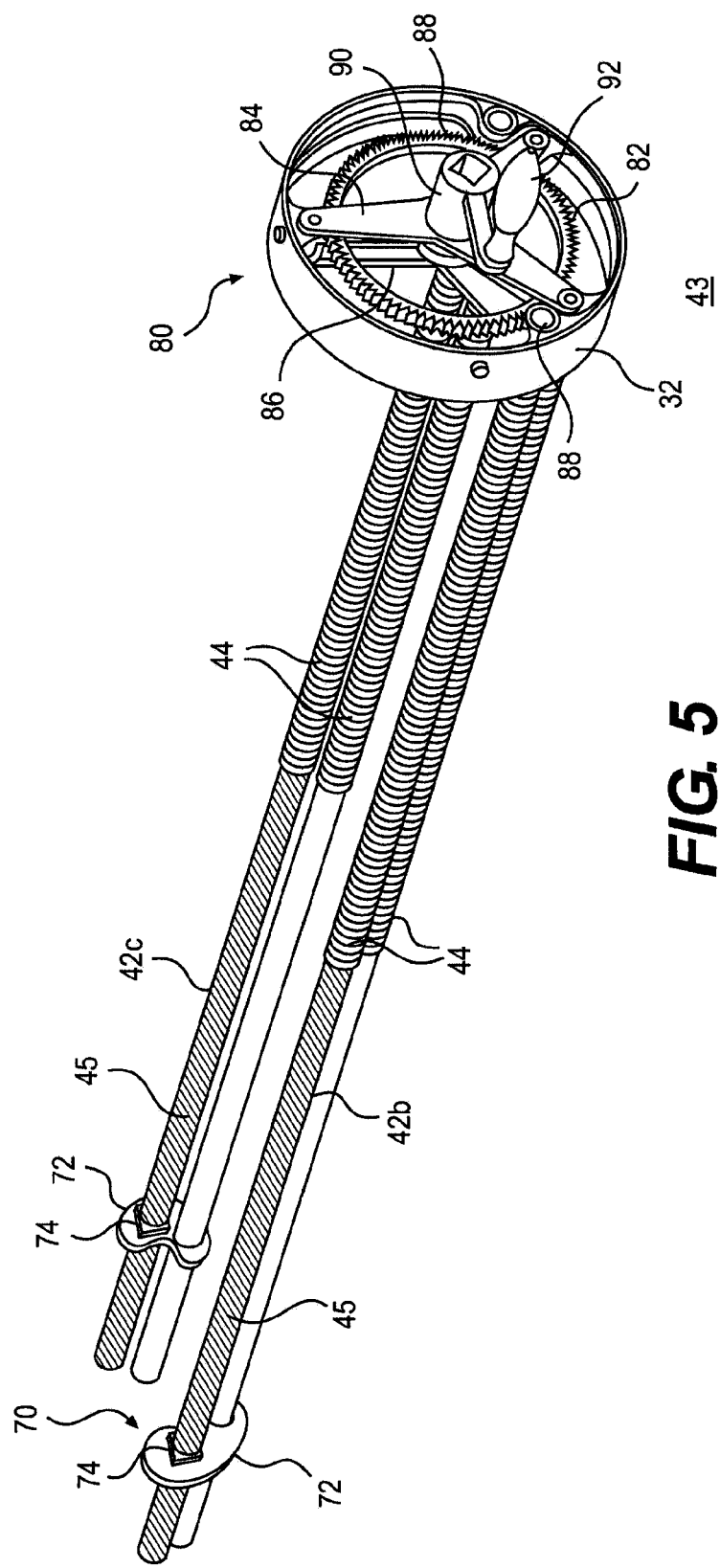
FIG. 5 is a perspective view of the system of FIGS. 1-4, showing a drive mechanism.

Referring now to FIG. 5, a cocking mechanism 70 operated by guide rods 42 may be provided to operate launch mechanism 50 (not shown in FIG. 5) to a cocked position. Cocking mechanism 70 may include a pair of plates 72 generally parallel to launch mechanism 50 and perpendicular to the axis of housing 22. Cocking mechanism 70 may also include a plurality of threaded engagement members 74, corresponding in number to the number of threaded guide rods 42. For example, engagement members 74 may comprise a pair of machine nuts respectively attached, such as by welding, to plates 72 over holes in plates 72. The threads of engagement members 74 may engage the threads of guide rods 42b and 42c. Thus, rotation of guide rods 42b and 42c may cause cocking mechanism 70 to translate along the axis of housing 22.

A drive mechanism 80 may be attached to the rear of housing 22. Drive mechanism 80 may include, for example, a ring gear 82 rotatably mounted on a rear plate 84 of spider 43, which may in turn be attached to rear tube ring 32. Guide rods 42b and 42c may pass through a front plate 86 of spider 43 and may be rotatably mounted upon rear plate 84. Drive wheels, such as rod gears 88, may be attached to guide rods 42b and 42c, and captured between front and rear plates 86 and 84 of spider 43, to engage ring gear 82. A drive member 90 may be fixedly attached to ring gear 80 and may extend though rear plate 84 and may be engaged by a handle 92.

Manual rotation of handle 92 may rotate ring gear 80, causing rod gears 88 to rotate guide rods 42b and 42c. Cocking mechanism 70 may be initially positioned on guide rods 42 at the front of housing 22, to the left of and out of contact with launch mechanism 50 when launch mechanism 50 is in the released position. Rotation of guide rods 42b and 42c by handle 92 may cause engagement members 74 to ride back to the right along guide rods 42b and 42c and cause cocking mechanism 70 to contact launch mechanism 50. Further rotation of handle 92 may be operative, via rotation of guide rods 42b, 42c and engagement between threads of guide rods 42b, 42c with engagement members 74, to cause cocking mechanism 70 to drive launch mechanism 50 to the right against springs 44, thereby compressing springs 44 and driving launch mechanism 50 back into the cocked position, where it may be captured by latch mechanism 52.

Handle 92 may then be rotated in the opposite direction, causing cocking mechanism 70 to ride back along guide rods 42 to the left in FIGS. 1-5 and to a launch position at the front of housing 22. Cocking mechanism 70 is thus well out of the way, to the left of the released position of launch mechanism 50, such that the cocking mechanism is not in contact with the launch mechanism when the launch mechanism is in the released position. Launch mechanism 50 may remain in the cocked position at the rear of housing 22 due to capture by latch mechanism 52.

Aircraft 64 may then be positioned within housing 22 into engagement with thrust members 62. Operation of trigger mechanism 59 may then be operative to release latch mechanism 52. The mechanical energy stored in springs 44 may rapidly propel launch mechanism 50 to the left toward the front of housing 22, thereby propelling aircraft 64 out of housing 22 at launch velocity.

The number and strength of springs 44 may be selected to permit storage of the amount of mechanical energy required to expel aircraft 64 from housing 22 at the required launch velocity. The ratio of the teeth of ring gear 82 and rod gears 84, and the pitch of the threads of guide rods 42b, 42c and engagement members 74 may be selected to give a mechanical advantage sufficient to permit reasonable manual effort supplied to handle 92 to provide a desired cocking time to compress springs 44. When system 20 is placed in the cocked condition, a safety mechanism, not shown, may be employed to avoid unintentional operation of latch mechanism 52.

Figure 6:
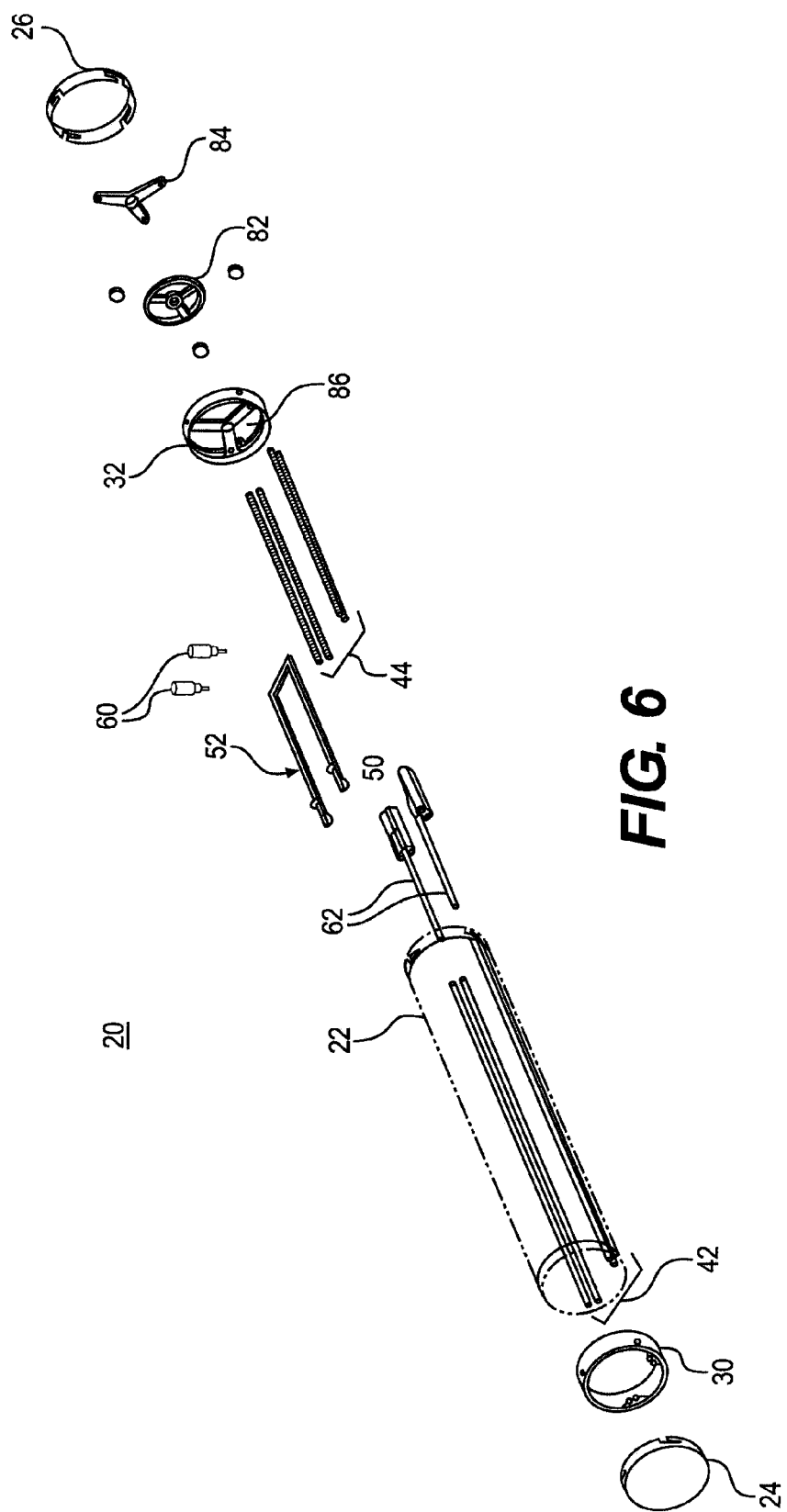
FIG. 6 is an exploded perspective view of components of the system of FIGS. 1-5.

FIG. 6 is an exploded perspective view of components of system 20.

Figure 7:
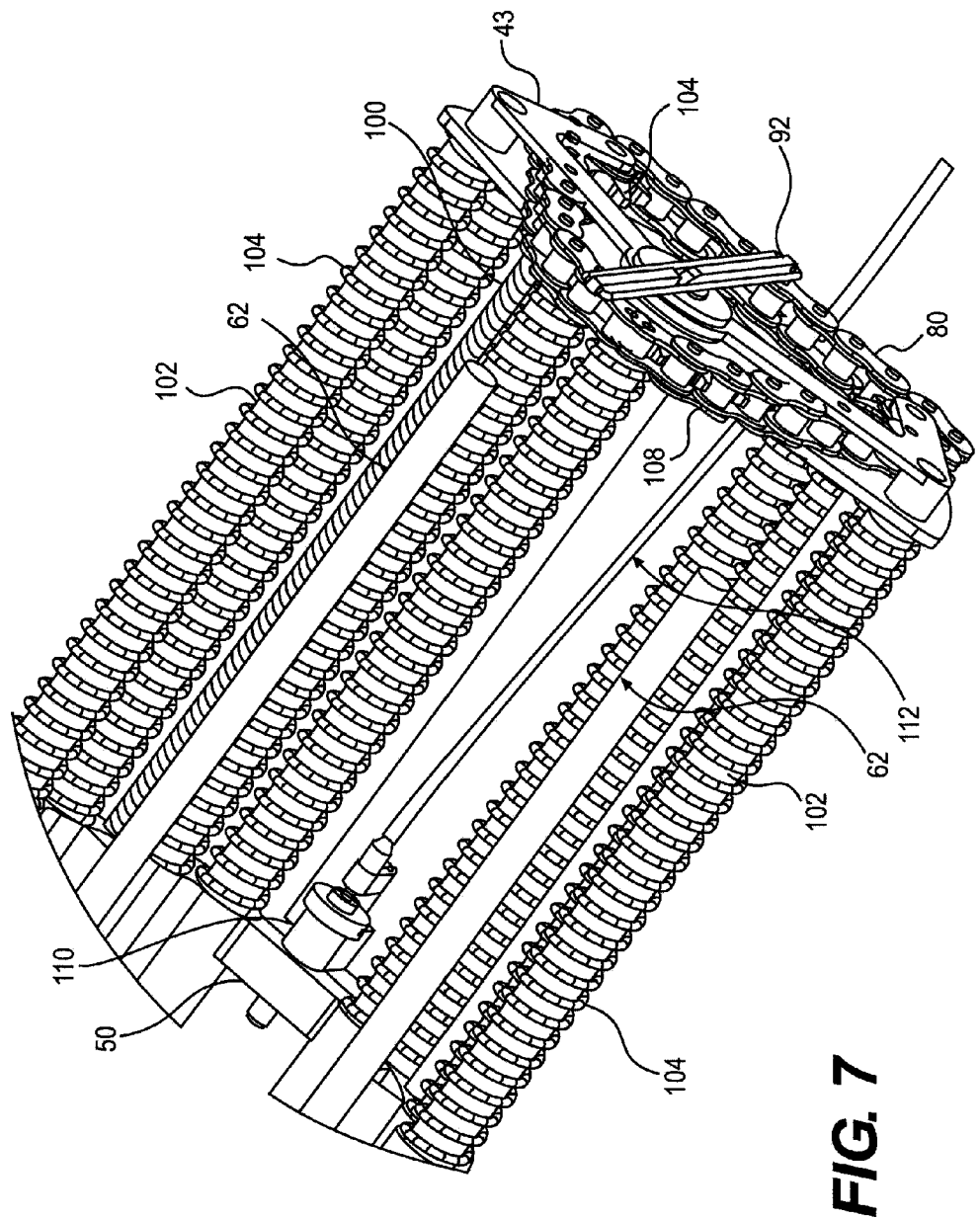
FIG. 7 is a perspective view of an exemplary second embodiment of a canister system for a folding aircraft.

FIG. 7 shows an exemplary alternate embodiment for system 20, using two threaded guide rods 100, and eight unthreaded guide rods 102. Eight compression springs 104 may be respectively positioned over unthreaded guide rods 102.

Figure 8:
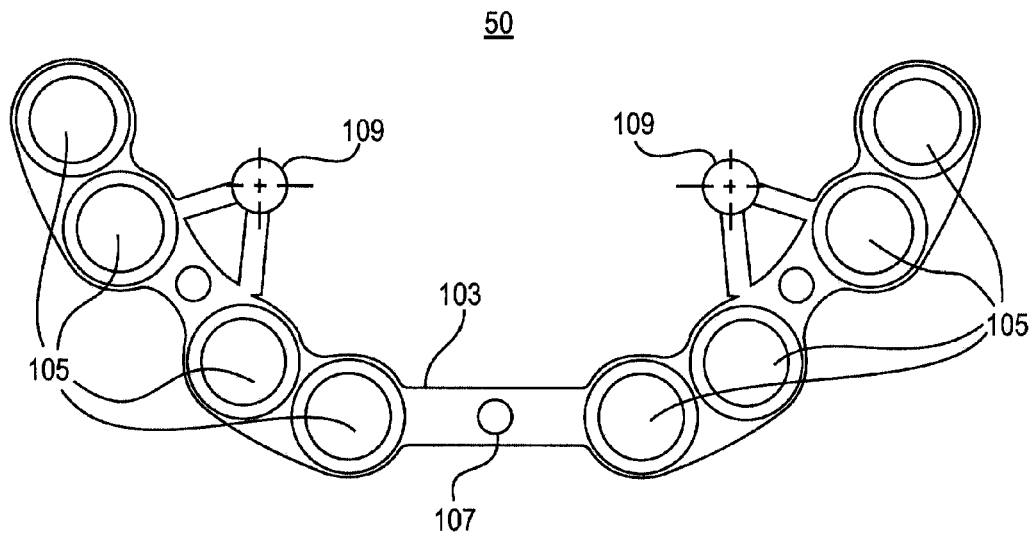
FIG. 8 is a detailed view of a launch mechanism of the embodiment of FIG. 7.

A detailed view of launch mechanism 50 of the embodiment of FIG. 7 is shown in FIG. 8. As can be seen, launch mechanism 50 includes a spreader member 103 having a plurality of holes 105 through which guide rods 102 extend. Another hole 107 is provided to cooperate with latch mechanism 52, in a manner to be described below. A pair of brackets 109 are provided as attachment points for thrust members 62.

In the embodiment of FIG. 7, drive mechanism 80 may operate wheels, such as rod sprocket gears 104, attached to guide rods 100 and supported by spider 43. A drive sprocket gear 106, may also be mounted on spider 43. A flexible coupling member, such as a chain 108, may be coupled to rod sprocket gears 104 and drive sprocket gear 106. For certain applications, the flexible coupling member may be a belt formed of rubber, composites, or other suitable material. Handle 92 may attached to drive sprocket gear 106. Rotation of handle 92 may be operable to simultaneously rotate rod sprocket gears 104 and guide rods 100, thereby driving cocking mechanism 70 between cocked and released positions. The ratio of the teeth between drive sprocket gear 106 and rod sprocket gears 104, and the pitch of the threads of guide rods 100 and engagement members 74 may be selected to give a mechanical advantage sufficient to permit reasonable manual effort supplied to handle 92 to provide a desired cocking time to compress springs 44. In certain applications, it may be desirable to include a motor interface (not shown) to permit a motor, such as an electric drill, to alternately provide the rotational effort to place launch member 50 in the cocked position.

Figure 9:
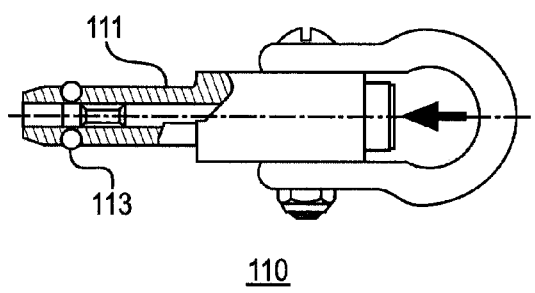
FIG. 9 is a detailed view of an exemplary ball lock pin forming a trigger mechanism of the embodiment of FIGS. 7 and 8.

In the embodiment of FIG. 7, a latch mechanism may be formed using a ball lock pin mechanism 110. Ball lock pin mechanism 110, shown in more detail in FIG. 9, may be, for example, a lifting pin component commercially available from Carr Lane Mfg. Co. of St. Louis, Mo. A shaft 111 of ball lock pin mechanism extends through hole 107 of launch member 50. Ball lock pin mechanism 110, using balls 113, may capture launch member 50 in the cocked position, corresponding to the operation of ears 54, notches 56, frame 58, and solenoids 60, shown in FIG. 4. A trigger cable 112 may be provided to manually trigger ball lock pin mechanism 110 to release launch mechanism 50. The operation of trigger cable 112 is similar to the operation of a photographic shutter release cable.

Figure 10:
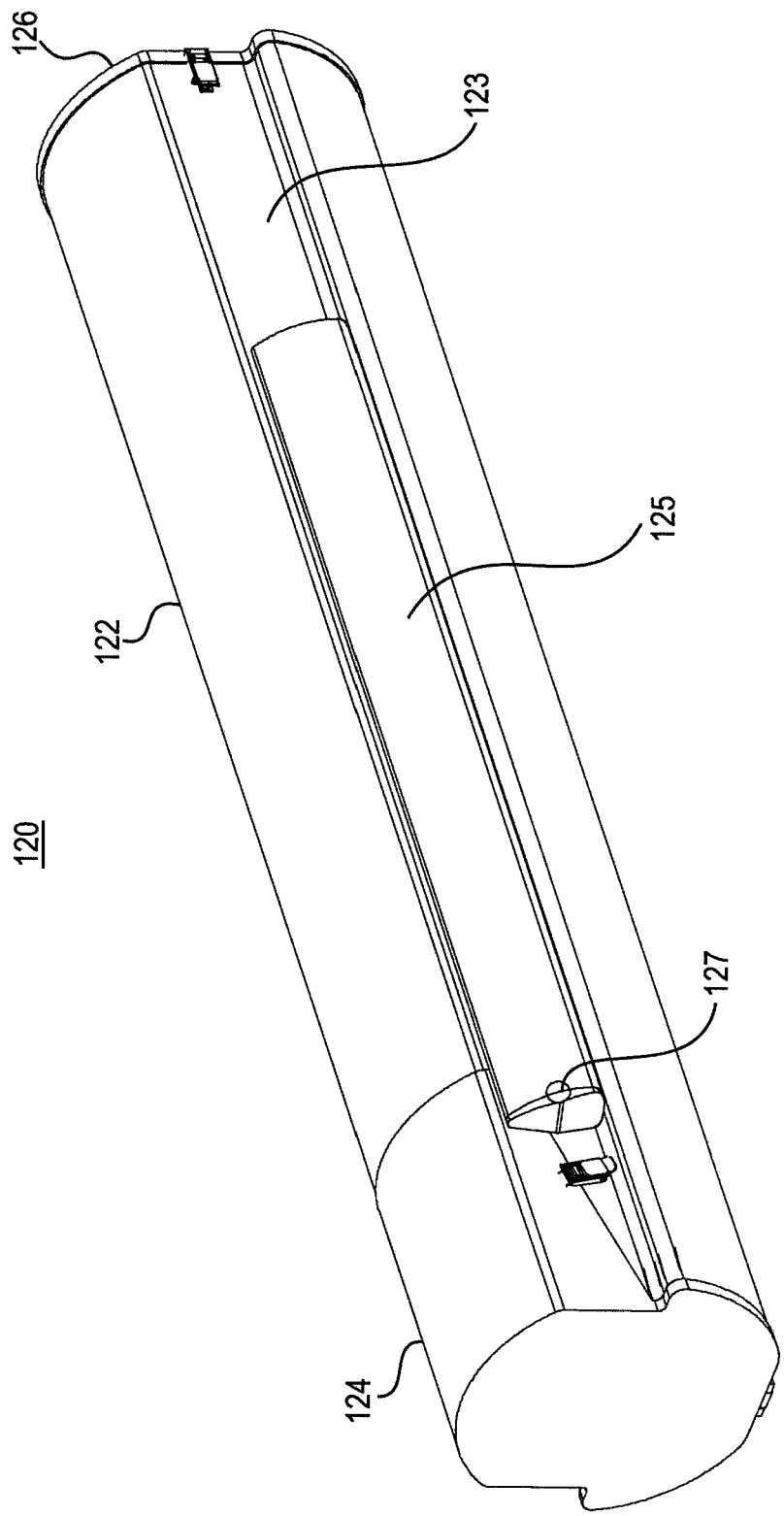
FIG. 10 is a perspective view of an exemplary third embodiment of a canister system for a folding aircraft.
Figure 11:
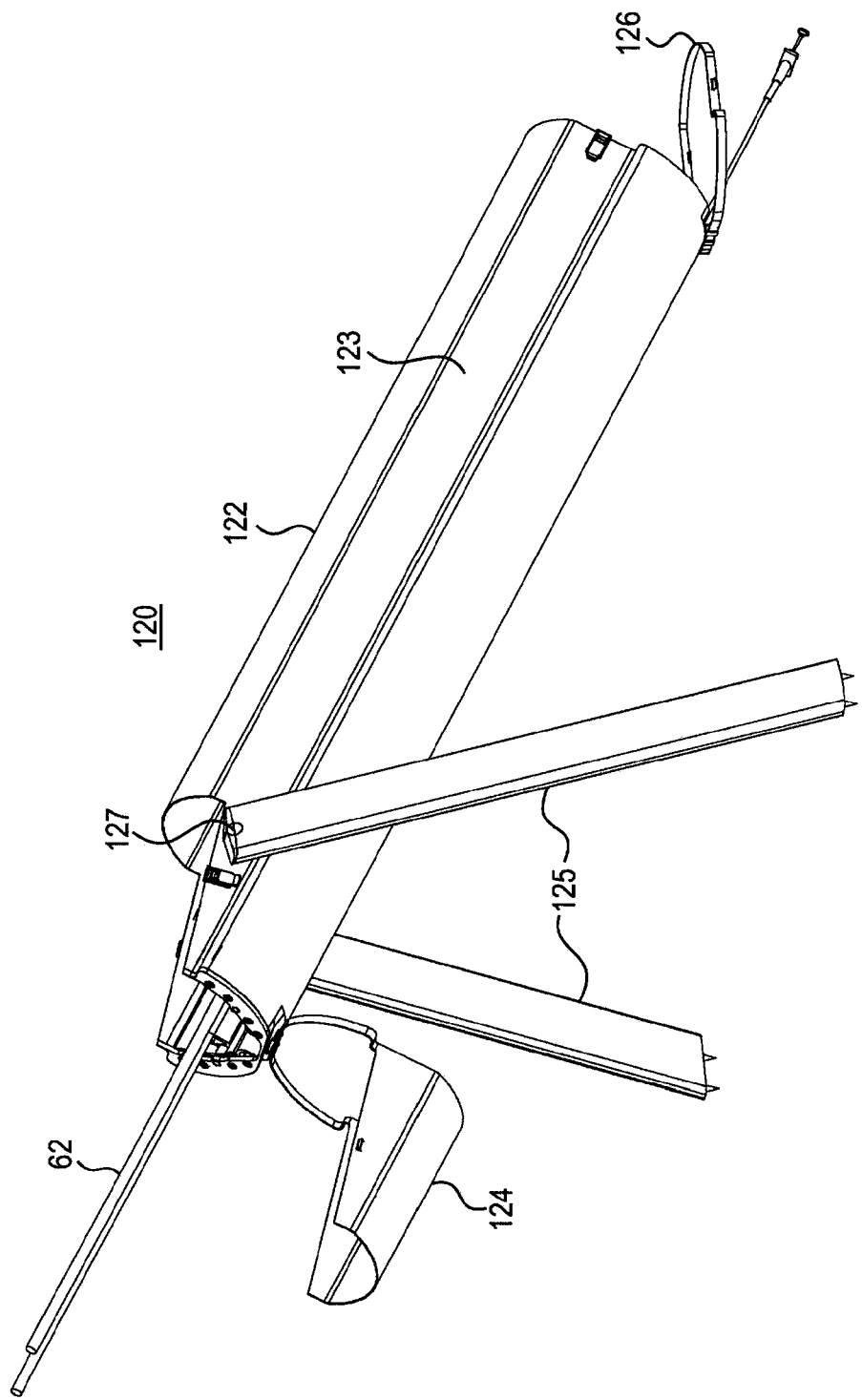
FIG. 11 is perspective view of the embodiment of FIG. 10 shown in a released condition.

Yet another exemplary embodiment is shown in FIG. 10. The embodiment of FIG. 10 is a system 120 which may include a fluted housing 122 having a pair of hinged end caps 124 and 126. Grooves 123 on either side of housing 122 receive a pair of legs 125 movably attached to housing 122 by pivots 127. Pivots 127 may be spring-loaded. Legs 125 may be pivoted to a deployed position, as shown in FIG. 11, to form a bipod launch configuration for system 120.

Figure 12:
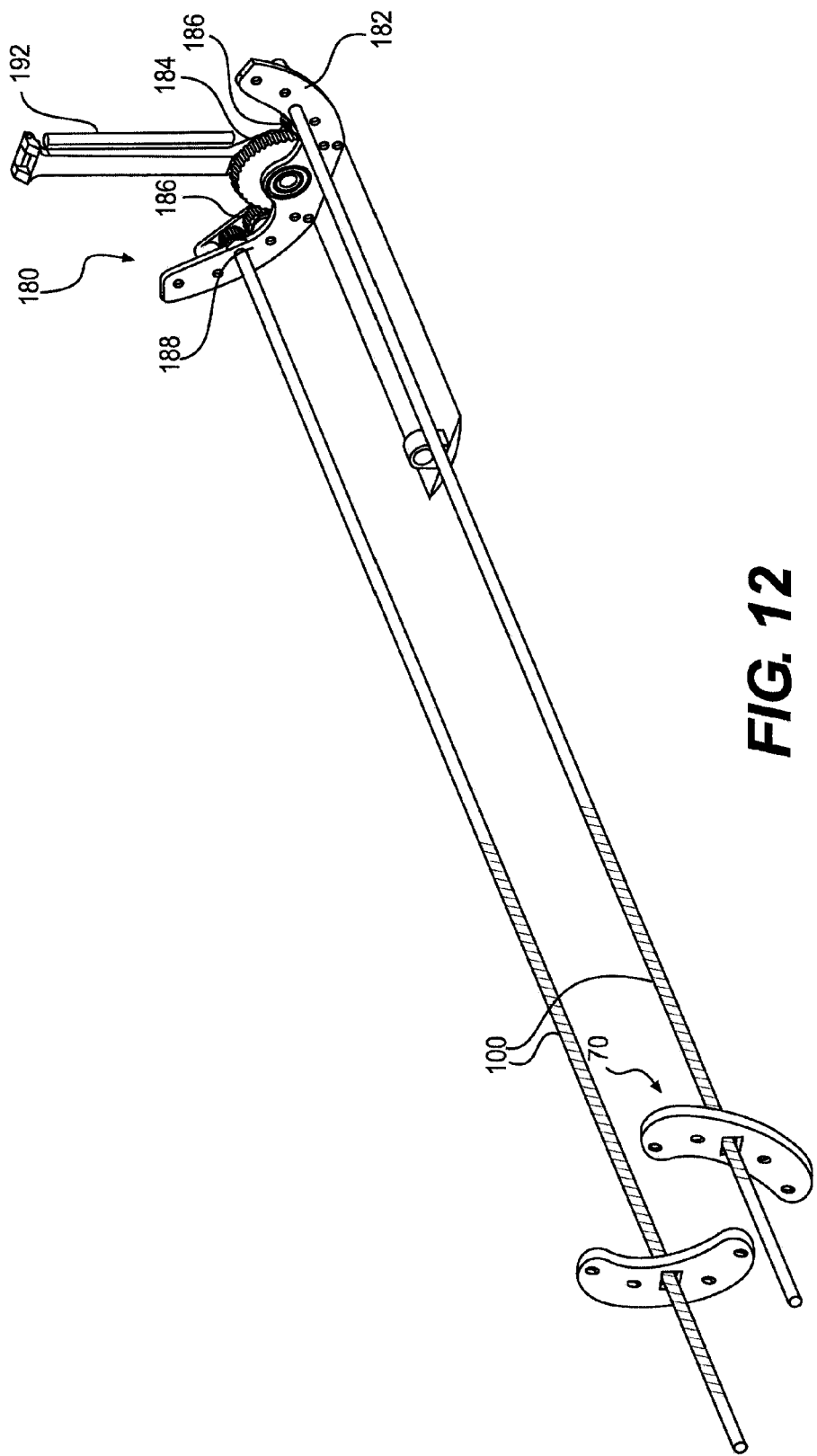
FIG. 12 is a perspective view of a drive mechanism of the embodiment of FIGS. 10 and 11.

System 122 may include a modified drive mechanism 180, as shown in FIG. 12. Drive mechanism 180 may include a spreader member 182 to which guide rods 102 (not shown in FIG. 12) may be attached. Also attached to spreader 182 is a drive gear 184, a pair of idler gears 186, and a pair of rod gears 188 (only one of which is visible in FIG. 12) attached to threaded rods 100. Rotation of a handle 192 is operable to rotate drive gear 184, idler gears 186, and rod gears 199 to rotate threaded rods 100 to operate cocking mechanism 70, in the manner described above, causing cocking mechanism 70 to translate along the axis of housing 122. The ratio of the teeth between drive gear 184 and rod gears 188, and the pitch of the threads of guide rods 100 and engagement members 74 may be selected to give a mechanical advantage sufficient to permit reasonable manual effort supplied to handle 192 to provide a desired cocking time to compress springs 44.

Housings 22 and 122 may protect aircraft 64 and provide the external structure and stiffening needed to hold the mechanisms described above. All parts may be made of suitable materials, such as metals, plastics, or composites, as dictated by the specific application, such as the weight and required launch velocity of aircraft 64.

The disclosed embodiments may allow for automatic deployment of an aircraft by a single user without the need to assemble parts of the aircraft or launching system. Assuming the disclosed embodiments have been cocked before use, an aircraft can be released within seconds, and if further launches are required, all that may be required is for a user to rotate handles 92 or 192 to operate launch mechanism 50 back to the cocked position, as no replaceable parts or propellants may be required. Furthermore, the disclosed embodiments may use few parts, may lock solidly in the cocked position, and may carry all necessary loads at a very minimal weight, while being able to launch an aircraft in a very short distance.

The disclosed embodiments have been described in detail with reference to the accompanying drawings, but the present disclosure is not limited to described examples. It should be understood by those skilled in the art that various modifications, combinations, sub-combinations and alterations may occur depending on design requirements and other factors insofar as they are within the scope of the appended claims or the equivalents thereof. Further, it should be understood that, as used herein, the indefinite articles "a" and "an" mean "one or more" in open-ended claims containing the transitional phrase "comprising," "including," and/or "having."

What is claimed is:

1. A system for launching an aircraft, comprising:
a housing;
a plurality of guide members mounted within the housing and comprising first engagement members;
one or more springs;
a launch member slidably movable along the guide members between cocked and released positions, the launch member comprising at least one thrust member adapted to engage the aircraft;
a cocking mechanism slidably moveable along the guide members;
a second engagement member attached to the cocking mechanism and engaging the first engagement member;
a drive mechanism mounted on the housing and operable when driven to operate the first and second engagement members so as to draw the cocking mechanism against the launch member, drive the launch member along the guide members from the released to the cocked position, and energize the springs;
a latch mechanism operable to latch the launch member in the cocked position; and
a trigger mechanism operable when activated to release the latch mechanism so as to permit the springs to drive the launch member from the cocked to the released position.

2. A system as recited in claim 1, wherein the first and second engagement members comprise threads.

3. A system as recited in claim 2, wherein the one or more springs comprise a plurality of compression springs coaxially positioned on the guide members.

4. A system as recited in claim 3, wherein the trigger mechanism comprises a ball lock pin.

5. A system as recited in claim 3, wherein the number of compression springs is equal to the number of guide members.

6. A system as recited in claim 3, wherein the number of compression springs is less than the number of guide members.

7. A system as recited in claim 2, wherein the drive mechanism comprises a plurality of rotatable members.

8. A system as recited in claim 7, wherein the rotatable members comprise a ring gear and a plurality of rod gears attached to the guide members.

9. A system as recited in claim 7, wherein the rotatable members comprise:
a plurality of idler gears;
a drive gear engaging the idler gears;
a handle attached to the drive gear; and
a plurality of rod gears attached to the guide members and engaging the idler gears.

10. A system as recited in claim 7, wherein the drive mechanism comprises a drive rotatable member, a plurality of rod rotatable members, and a flexible coupling member coupling the drive rotatable members to the rod rotatable member.

11. A system as recited in claim 10, wherein the flexible coupling member comprises a chain.

12. A system as recited in claim 10, wherein the flexible coupling member comprises a belt.

13. A system as recited in claim 1, wherein the latch mechanism comprises a plurality of ears and a plurality of notches.

14. A system as recited in claim 13, wherein the trigger mechanism comprises a solenoid.

15. A system as recited in claim 1, wherein the drive mechanism is operable to draw the cocking mechanism away from the launch mechanism after the latch mechanism has latched the launch mechanism and to position the cocking mechanism at a launch position out of contact with the launch mechanism when the launch mechanism is in the released position.

16. A system as recited in claim 1, wherein all of the guide members comprise first engagement members.

17. A system as recited in claim 1, wherein only a subset of the guide members comprise first engagement members.

18. A system as recited in claim 1, comprising shoulder support attached to the housing.

19. A system as recited in claim 1, comprising plurality of movable legs attached to the housing.

20. A system as recited in claim 1, comprising a plurality of end caps removably attached to the housing.

21. A system as recited in claim 1, comprising:
a plurality of hinges attached to the housing; and
a plurality of end caps attached to the hinges and operable between open and closed positions with respect to the housing.

22. A system as recited in claim 1, wherein the one or more springs comprise one or more tension springs.

23. A system for launching an aircraft, comprising:
a tubular housing;
a plurality of threaded guide members mounted within the housing;
one or more springs positioned around the guide members;
a launch member slidably movable along the guide members between cocked and released positions, the launch member comprising at least one thrust member adapted to engage the aircraft;
a cocking mechanism slidably moveable along the guide members;
a threaded engagement member attached to the cocking mechanism and engaging threads of the threaded rods;
a drive mechanism mounted on the housing and operable when driven to rotate the threaded rods within the engagement member so as to draw the cocking mechanism against the launch member, drive the launch member along the guide members from the released to the cocked position, and compress the springs;
a latch mechanism operable to latch the launch member in the cocked position; and
a trigger mechanism operable when activated to release the latch mechanism so as to permit the springs to drive the launch member from the cocked to the released position.

* * * * *